United States Patent
Xia et al.

(10) Patent No.: US 9,507,353 B2
(45) Date of Patent: Nov. 29, 2016

(54) PLC BASED THERMOSTAT TEMPERATURE CONTROL FOR HEATING SYSTEMS

(71) Applicant: ASOKA USA CORPORATION, Santa Clara, CA (US)

(72) Inventors: Mingyao Xia, Shenzhen (CN); Eric Grubel, Thousand Oaks, CA (US); Dan Castellano, Cupertino, CA (US)

(73) Assignee: Asoka USA Corporation, San Ramon, CA (US)

( * ) Notice: Subject to any disclaimer, the term of this patent is extended or adjusted under 35 U.S.C. 154(b) by 532 days.

(21) Appl. No.: 13/960,741

(22) Filed: Aug. 6, 2013

(65) Prior Publication Data
US 2015/0045968 A1    Feb. 12, 2015

(51) Int. Cl.
G05D 23/19    (2006.01)

(52) U.S. Cl.
CPC ...... *G05D 23/1917* (2013.01); *G05D 23/1905* (2013.01)

(58) Field of Classification Search
None
See application file for complete search history.

(56) References Cited

U.S. PATENT DOCUMENTS

| | | | |
|---|---|---|---|
| 6,357,243 B1 | 3/2002 | Efron et al. | |
| 2009/0065597 A1* | 3/2009 | Garozzo | F24F 11/0009 236/51 |
| 2009/0125351 A1 | 5/2009 | Davis, Jr. et al. | |
| 2009/0312886 A1 | 12/2009 | Kikuchi et al. | |
| 2011/0006887 A1* | 1/2011 | Shaull | G05B 15/02 340/12.37 |
| 2011/0140911 A1 | 6/2011 | Pant et al. | |
| 2012/0206108 A1* | 8/2012 | Waring | H02J 3/14 320/137 |
| 2013/0049662 A1 | 2/2013 | Keong et al. | |
| 2013/0184885 A1 | 7/2013 | Keil et al. | |

OTHER PUBLICATIONS

Electronics; CEA Announces New Modular Communications Interface Standard for Energy Management, Energy Weekly News Mar. 15, 2013, p. 188.*
"Bringing the smart grid standards to your products", USNAP Alliance http://www.usnap.org/, Copyright 2012/13 USNAP alliance, 275 Tennant Ave. Morga Hill, CA.

* cited by examiner

*Primary Examiner* — Sean Shechtman
*Assistant Examiner* — Steven Garland
(74) *Attorney, Agent, or Firm* — Michael A. Glenn; Perkins Coie LLP (57) ABSTRACT

A system and method disclosed herein are for providing local and remote control of home and enterprise heating systems (thermostats) via the Power line communication (PLC) networks configured to provide communication and power control capability within a local area network. The PLC based control unit allows the remote access and control of the thermostat of local heating systems from within and outside the PLC based local area network.

4 Claims, 5 Drawing Sheets

PLC BASED THERMOSTAT TEMPERATURE CONTROL FOR HEATING SYSTEMS

BACKGROUND OF THE INVENTION

Technical Field

This invention relates generally to the field of providing control of room temperature. More specifically, this invention relates to remote control of low voltage thermostats used for temperature control in homes and enterprises, using power line communication connections through the low voltage power lines.

Description of the Related Art

It has been found that 45-50% of the energy usage in the home is due to heating and cooling the home. Successful implementation of the Smart Grid for control of home heating and cooling requires communication to the home and to thermostat for control. The system for thermostat control must be able to respond to changes in grid conditions such as energy prices, critical peaks, and other curtailment events and provide control capability for the thermostat over the local area network (LAN), Home area network (HAN) and the internet.

Utilities and service providers are deploying a variety of communication standards and technologies today. Smart Grid information may reach the home through diverse means, e.g. AMI system, cellular, FM radio, Internet, paging, power-line carrier, etc., each being optimal under different circumstances. Within the home, these signals may be received directly by individual end devices or may pass through an energy management system or gateway.

The term USNAP is an acronym for Universal Smart Network Access Port, a simple, cost effective, solution that enables any LAN, HAN or DR (Demand Response) standard, present and future. This standard can be used to communicate with thermostats within the home. By providing industry with a protocol independent modular communication interface (MCI) that connects communication devices to any products that comply with advanced metering infrastructure (AMI) standard, it is possible for manufacturers to produce intelligent and energy aware consumer products, such as thermostats that are able to interact with the Smart Grid.

Figure 1:
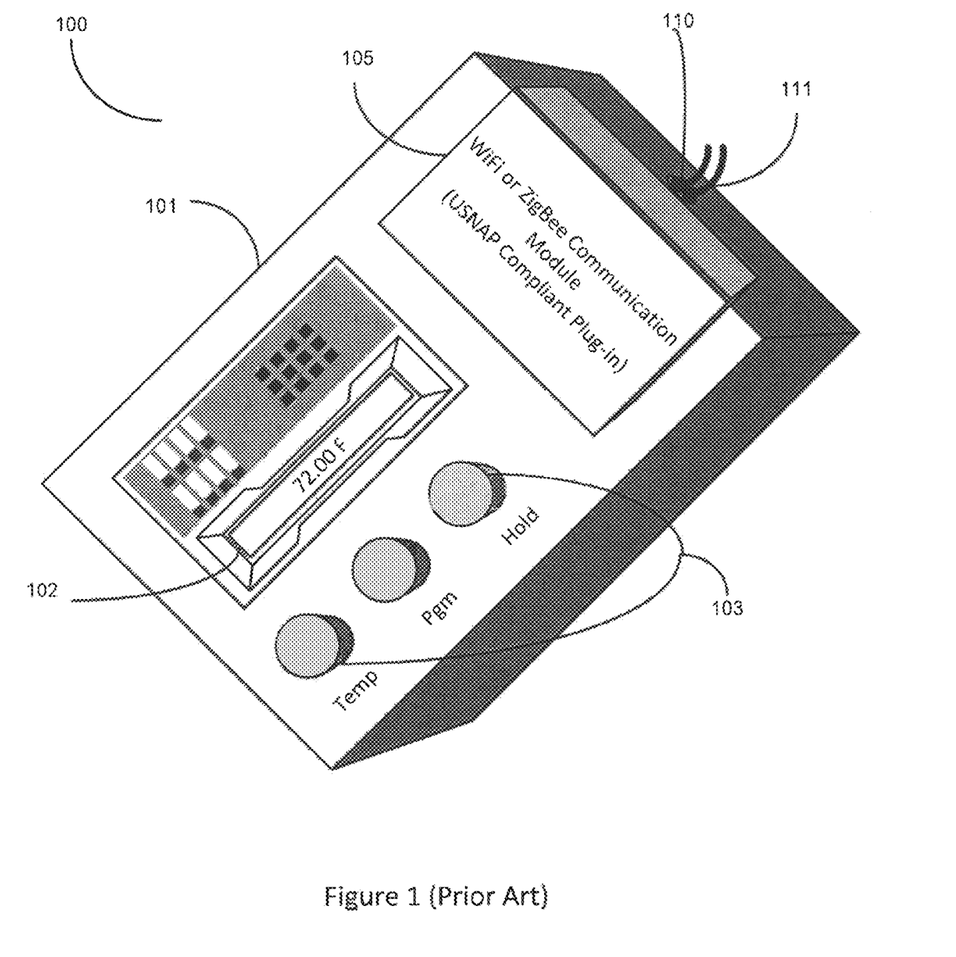
FIG. 1 is a block representation of a thermostat with plug-in USNAP compatible ZigBee® or Wi-Fi communication module, according to the prior art.

Currently there are few remote controlled thermostats being used. Some of the new thermostat control products that are USNAP compliant and operate via wireless links are such as Wi-Fi, Z-wave and ZigBee®. The advantage of the USNAP compliance is that the various USNAP compliant modules are replaceable within the thermostat and connect seamlessly to the controller to provide the necessary controllability via the LAN, HAN or internet. FIG. 1 is a block diagram representation 100 of the prior art thermostat 101 with a USNAP enabled replaceable plug-in module 105 that is one of a Wi-Fi or ZigBee® enabled. The display 102 provides the temperature and other program information relevant to the controller. Under normal operation the temperature of the room is displayed. The set of controls 103 allows setting and changing of the temperature of the surroundings of the thermostat 101. A low power supply line 110 combined with a control lead 111 run from the thermostat to the furnace and air conditioning unit. The low voltage power supply typically provides a 24 Volt AC supply to the thermostat or controller from the furnace.

Previously providing data communication connection to appliances that were isolated by step-down or step-up transformers was expensive as special bypass capacitors had to be installed on the transformers to allow data to pass from one side to the other. In the case of thermostat control the thermostat is powered by low voltage generated by stepping down the supply voltage. This has limited the use of the power line communication (PLC) based data communication connections to the thermostat for climatic (temperature) control of the home or enterprise.

SUMMARY OF THE INVENTION

A system and method disclosed herein are for providing local and remote control of home and enterprise heating systems (thermostats) via the Power line communication (PLC) networks configured to provide communication and power control capability within a local area network. The PLC based control unit allows the remote access and control of the thermostat of local heating systems from within and outside the PLC based local area network.

DETAILED DESCRIPTION OF THE INVENTION

Power line communication (PLC) systems have not been very accepting of interconnection through different power levels in the past due to the need for bypass capacitors to be added to step-up and step-down transformers, etc., for enabling transfer of data. Experimentation has recently shown that communication can be enabled without adding components to each transformer used for step-up and step-down. This finding has resulted in the current capability for providing a system and method for local and remote control of home and enterprise heating systems (thermostats) via the PLC networks configured to provide communication and power control capability within a local area network. The PLC based control unit allows the remote access and control of the thermostat of local heating systems from within and outside of the PLC based local area network (LAN).

In accordance with an embodiment, a PLC based thermostat control capability that is low cost, meets the Universal Smart Network Access Port (USNAP) specification, and facilitates smart grid implementation, is provided for thermostat control within the home or enterprise.

Implementation of green technologies requires monitoring and control of the carbon footprint of homes and offices and has created a need to assess the power usage pattern and the magnitude of usage remotely and to supervise and control the power remotely. It is necessary to monitor and control the power use on a micro level for the consumer, who can exercise the necessary constraints on use if the proper tools are provided. It is also necessary to monitor the usage pattern and collect data on a macro level to develop policies that are beneficial to the overall reduction of the carbon foot print at the home and office level, as well as on a national level. Empowering the individual and the society to exercise the necessary controls by monitoring the power usage is an area where power line communication and control can be effectively and optimally used.

PLC based systems have become more common within the HAN and LAN, due to their capability to use existing power line wiring within the home and enterprise while providing high bandwidth connectivity within the premises at a lower cost than other connection means. PLC based systems are also able to connect to the internet easily and provide the capability for the monitor and control of connected appliances within the home from the HAN, LAN and internet. Co-pending patent application Ser. No. 13/032,454 filed on Feb. 22, 2011 (now U.S. Pat. No. 8,755,946), Ser. No. 13/249,058 filed on Sep. 29, 2011, Ser. No. 13/181,293 filed on Jul. 12, 2011 (now U.S. Pat. No. 9,257,842), and Ser. No. 13/270,896 filed on Oct. 11, 2011 by the same applicants and assigned to the same entity, which are incorporated into this application in their entirety by reference, provide the capability for establishing the PLC based LAN and HAN and provide for monitoring and controlling systems for the smart grid implementation.

In an embodiment of the invention, a group of sensor devices is connected to the power line and configured for collecting power usage information and enabling power management to reduce the carbon foot print of the home, as well as to provide local area networking. In one embodiment of the invention, the devices include an intelligent master sensor and its sub-sets, such as but not limited to a communication and power management sensor and a power control switch sensor. The master device is configured to collect, compile, and communicate the collected data via the web or other communication medium to the outside world. The master device also receives and distributes control instructions that are used to control the power usage via the associated switches in the home or office. The sensors are used in the home or office environment to provide integrated sensing and control of home power usage and power management, while establishing a LAN having communication capability, including streaming media delivery capability.

The fact that over 45% of the power usage of the home is due to climatic control of the home namely heating and cooling has made it desirable to find a way to control the thermostat for climatic control by an optimum means meeting the green technology limitations. The PLC based thermostat control meets this need well. Such a system is disclosed that works with a PLC based LAN to provide monitoring and control of the climatic system of the home or enterprise.

Figure 2:
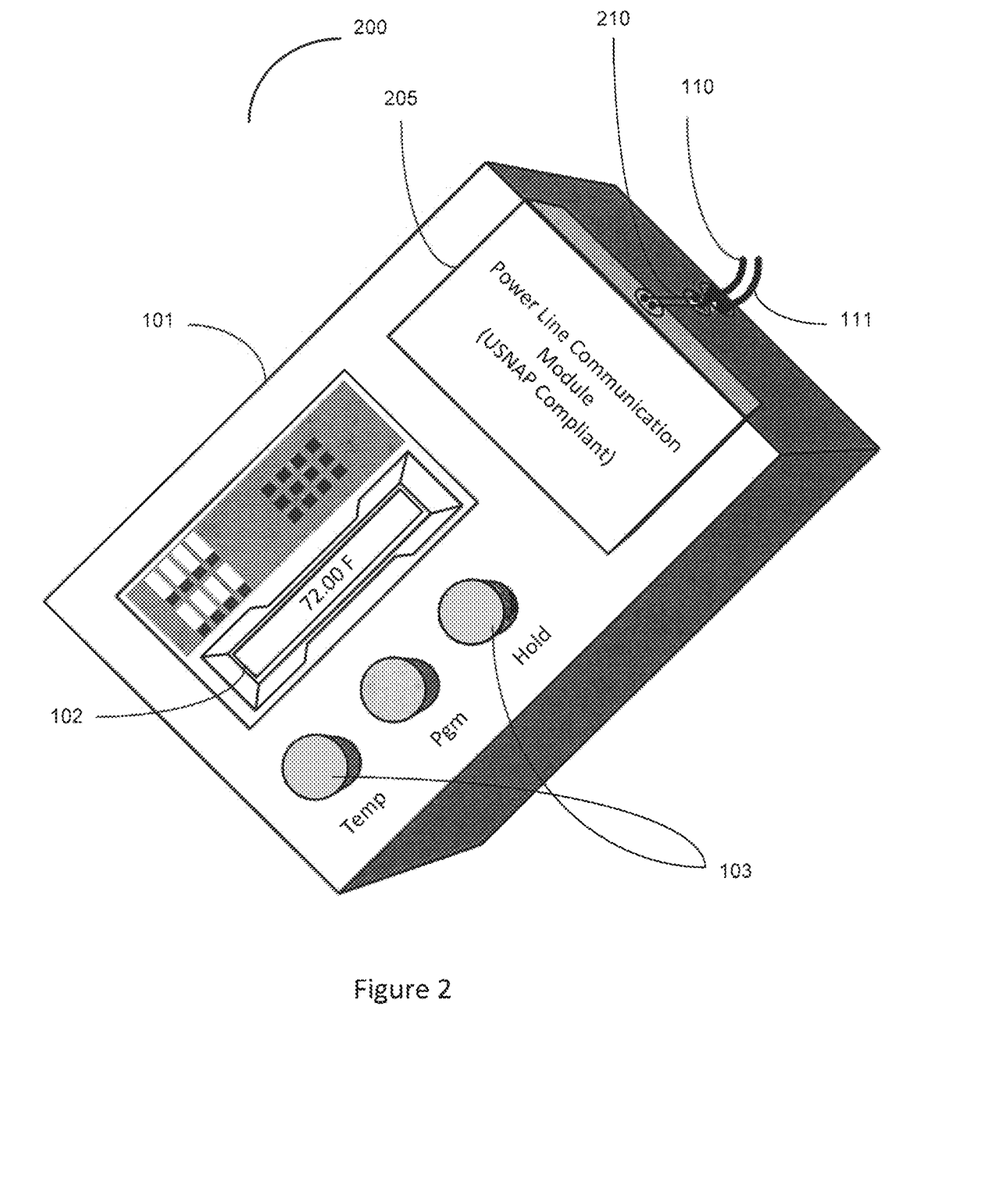
FIG. 2 is a block representation of a thermostat with plug-in USNAP compatible PLC communication module, according to an embodiment.

FIG. 2 is a block representation 200 of a thermostat 101 for home climate control where a PLC based plug-in unit 205 that is USNAP compliant is incorporated. The controller has a display screen 102 to display the temperature of the rooms and the control steps when under local control. The three exemplary control knobs 103 of controller 101 are used for setting the temperature or programming the controller manually. The PLC based interface plug-in 205 replaces the prior art plug-in 105 and enables PLC based connection 210 of the controller via the low voltage power supply line 110. It also connects to the furnace and air conditioning unit ("furnace/AC" or sometime collectively "furnace") through the cable 111 for control and monitoring.

Figure 3:
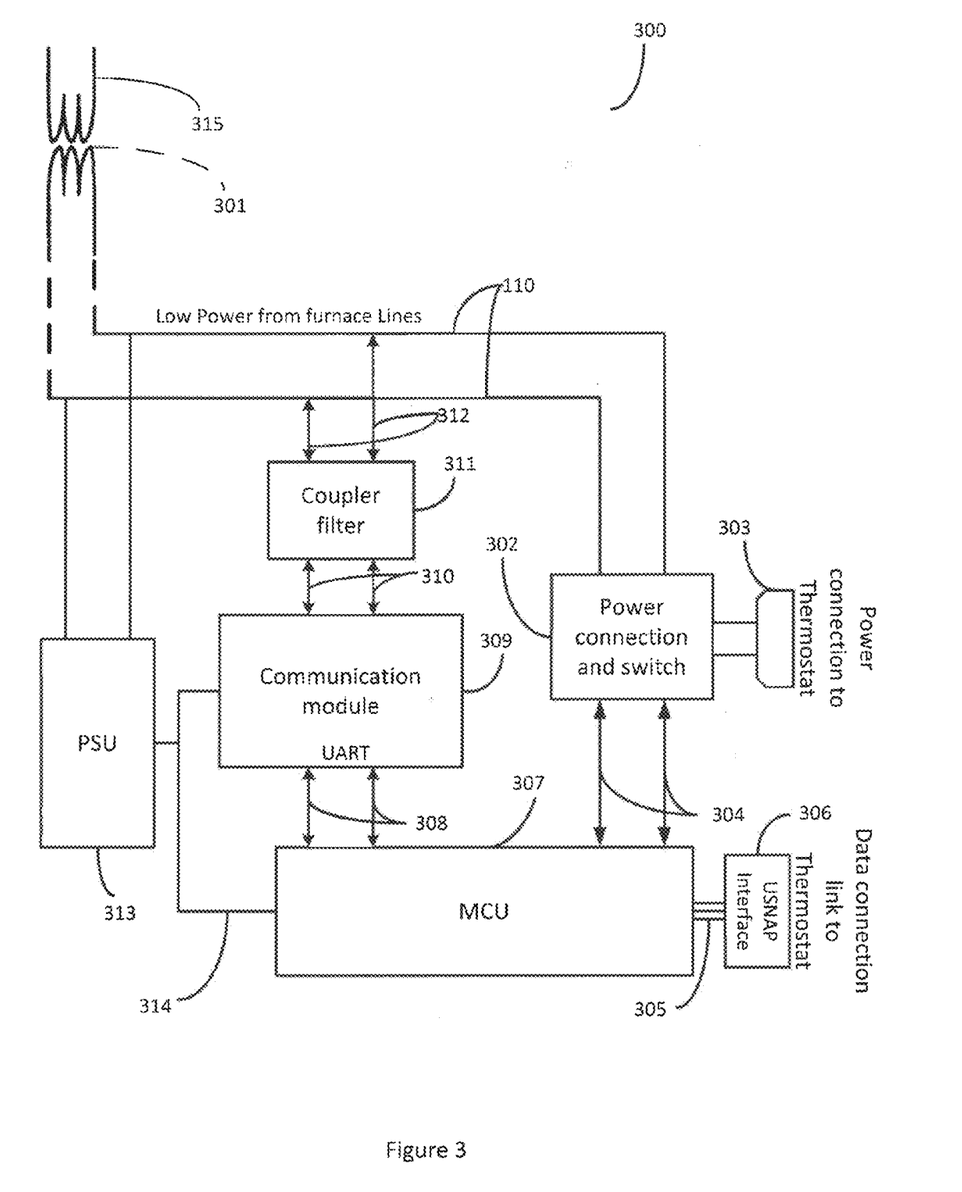
FIG. 3 is a block diagram of a PLC based USNAP compliant interface plug-in unit for a thermostat control connected through the low voltage power connection from the furnace/AC, according to an embodiment

FIG. 3 shows an exemplary block diagram 300 of the PLC based USNAP compliant thermostat interface plug-in (PLC-IPI) module 205. The low voltage power is generated by the step-down transformer 301 at the furnace location and sent over the low voltage power line 110 to the PLC-IPI module 205. The low voltage power line 110 connects to a power supply unit 313. Power supply unit 313 generates the necessary voltages for the PLC based plug in unit comprising at least the communication module 309 and the microprocessor unit (MCU) 307. The power to the thermostat is provided through a power connection and switch module 302 connected to a power plug 303 that supplies power to the thermostat. A switch control connection 304 from the MCU 307 provides for controlling and monitoring the power flow from the power supply line to the thermostat through the power plug 303. The low power line 110, which also acts as a part of the PLC LAN network, is connected to communication module 309 through a coupler filter 311. The coupler filter 311 is connected to the low power supply line 110 by a link 312 and the coupler filter 311 is further connected to the MCU by another communication link 310. The coupler filter 311 helps to isolate communication module 309 from the power supply 110 and allow only the modulated data, either broad band or narrow band, which comes over power line 110 to pass through to communication module 309. Communication module 309 acts as the link between the MCU 307 and the low voltage power supply lines 110 acting as part of the PLC network, to provide the necessary capability to modulate the information and monitoring data provided by the MCU 307 and put such information and monitoring data on the PLC network, that is the low power supply line 110, through the coupler filter module 307. The MCU 307 communicates with communication module 309 by communication link 308. The MCU 307 is connected to the thermostat through the USNAP interface port 306. The thermostat sensors measure and collect the status of climatic control of the home or enterprise and pass it on to the MCU 307 for compilation and processing and for modulation by the communication module 309 and transfer to the PLC network through the low power supply line 110. Similarly any control instructions received from the PLC LAN over the low voltage power lines 110 are received and demodulated by the communication module and passed on to the MCU 307 for providing control instruction to the switch module 303 and for control and programming via the USNAP interface 306 to the connected thermostat. The control instructions from the thermostat to the furnace and air conditioning unit are sent through the control link 111.

Figure 5:
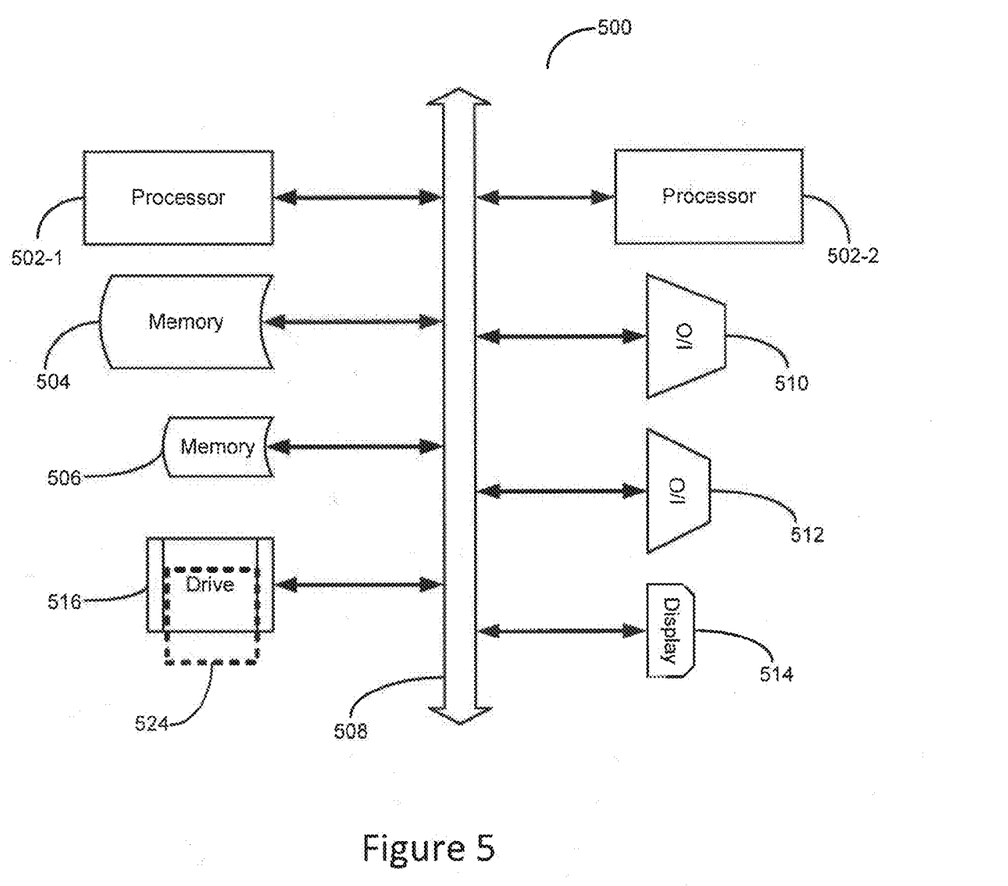
FIG. 5 is a block diagram of a processing unit, according to an embodiment.

In an embodiment, MCU 307 may be implemented as a processing unit 500. For example as shown in FIG. 5, an exemplary block diagram of a processing unit 500 has various components that may include among others at least a processor 502-1 and 502-2, multiple memory modules 504 and 506, a data and control bus 508 for transferring data and instructions between the components, one or more input/output interface modules 510 and 512 and a display 514, a removable drive 516 enabled for a machine readable medium 524, and other components needed or desired to generate instructions contained in associated software, firmware, or combination thereof. These sets of instructions may cause the system to perform any one of the foregoing methodologies and ray be executed for enabling thermostat control using the herein described module and system. MCU 307 may be implemented as a system on chip (SoC), an application specific integrated circuit (ASIC), a field programmable gate array (FPGA), or a combination thereof, with any additional necessary components, and without prejudice.

Figure 4:
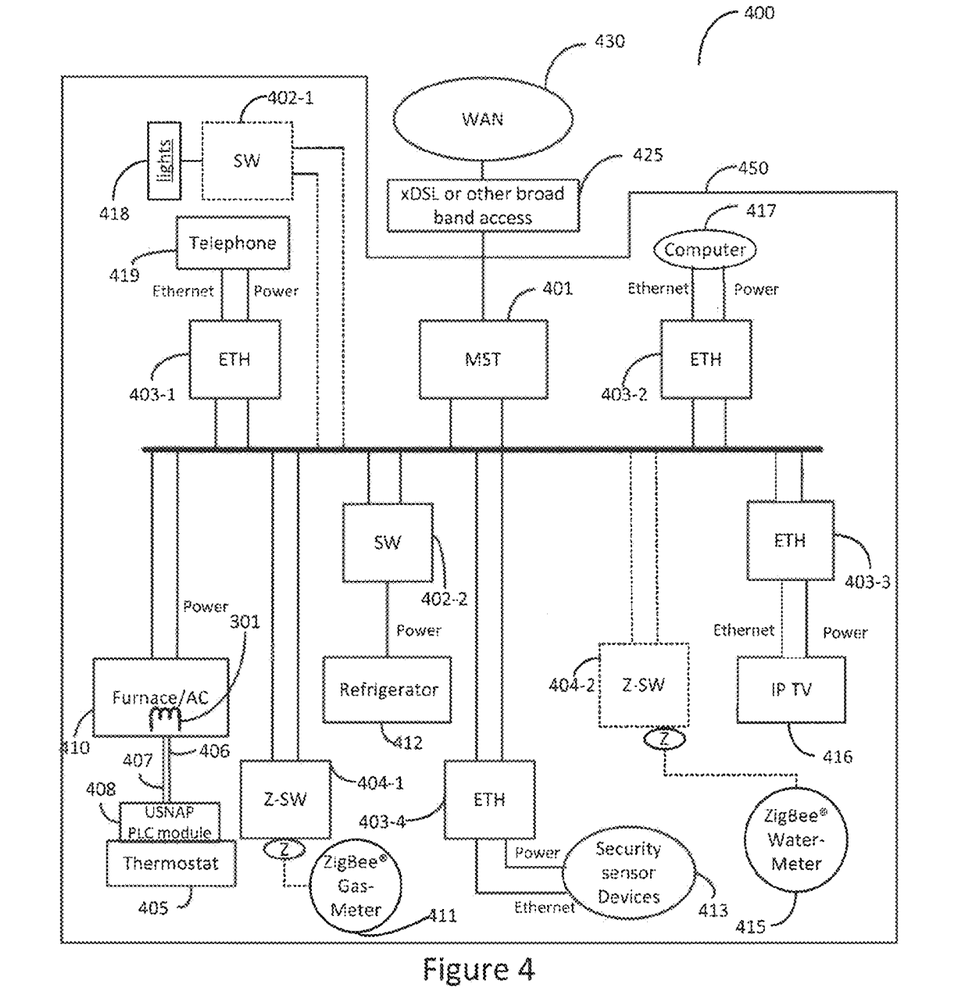
FIG. 4 is a block diagram of a PLC LAN having an Internet gateway with multiple connected components including the PLC based thermostat for home climate-control, according to an embodiment.

FIG. 4 shows an exemplary block diagram 400 of a PLC LAN 450 having an Internet gateway with multiple connected components including the PLC based thermostat for home climate control.

PLC LAN 450 has a master unit (MST) 401 that provides the computing power and storage capability necessary to collect and compile power consumption information provided to it. The connected power switch (SW) units 402-1 to 402-2 and the data communication enabled, e.g. Ethernet enabled, power switch units, (ETH) 403-1 to 403-4, monitor the power usage of devices and appliances connected to their respective power plugs. This information is sent over the local power distribution lines in the home or office to the MST 401 for compilation of data on usage. A pair of ZigBee® enabled power switch units (Z-SW) 404-1 and 404-2 are used to monitor and control the water and gas meters via PLC LAN 450. With the capability and computing power available, MST 401, with the proper software, is able also to exert local and emergency control of the appliances connected to the SWs and ETH units. MST 401 may further act as a gateway connecting to the broad band communication modem to enable a communication pathway to the Internet cloud, e.g. wide area network (WAN) cloud.

A step-down transformer 301 at the furnace/AC unit 410 provides a low voltage power supply via the low voltage power line 406 to the PLC-IPI module 408 and through the power supply connection 303 to the thermostat 405. The low power supply line also carries the control instructions to the thermostat 405 and measures status response from the thermostat 405 via the data link 306 of the PLC-IPI module 408, to the MST 401 of the PLC LAN 450. A furnace/AC control link 407 connects the thermostat 405 to the furnace/AC 410. The fact that the USNAP interface between the thermostat and the PLC-IPI module 408 is standardized allows commercially available thermostats 405 to be used with the PLC-IPI module 408 without any major changes.

The PLC-IPI module 408 described herein is able to provide a PLC LAN based system that provides capability for control of the home or enterprise climate control from within the PLC LAN 450 or remotely from outside the PLC LAN 450 from the WAN. As described in the applications incorporated by reference earlier the system is able to provide the capability for monitoring and control of the power usage of the connected units. The system further provides the ability to handle communication within the LAN and also connect to the WAN through the MST. By using one or more current embodiments, the ability to completely monitor and control the climatic system of the home or enterprise has also been established or is achieved.

To facilitate the green technology, macro level collection and compilation of power usage information and the collected power monitoring and usage information are transmitted over the WAN gateway to one or more central power usage collection units. These units collect the data for analysis and provide input to the public bodies for making policy decisions on greenhouse gas reduction requirements.

A person skilled-in-the-art would readily appreciate that the invention disclosed herein is described with respect to specific embodiments of the units currently used. However, this should not be considered a limitation on the scope of the invention. Specifically, other implementations of the disclosed invention are envisioned and hence the invention should not be considered to be limited to the specific embodiments discussed herein above. The units may be implemented as an assembly of individual components, as a combination of components and integrated circuits, or as one or more SOCs. The interface unit may also be made as an independent unit which can be connected by wire to the thermostat. The invention should not be considered as being limited in scope based on specific block level details, but should be considered on the basis of current and future envisioned functionality.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc., or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable enterprises to provide PLC based thermostat temperature control for heating systems on such internet-enabled or other network-enabled devices, servers, or clients. It further should be appreciated that one or more cloud computing embodiments may include aspects of PLC based thermostat temperature control for heating systems using mobile devices, tablets, and the like, as such devices are becoming standard consumer as well as computing devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system that enables a power line communication (PLC) PLC local area network (LAN) having an internet gateway to be communicatively connected to a PLC based Universal Smart Network Access Port (USNAP) compliant thermostat PLC-interface plug-in (PLC-IPI) module for a thermostat for environment climate control, comprising:
   a master unit (MST) configured to provide computing power and storage capability necessary to collect and compile power consumption information, wherein the MST is the internet gateway connecting to a broad band communication modem and enables a communication pathway to the internet;
   a step-down transformer at a furnace/air conditioning (AC) unit configured to provide a low voltage power supply via a low voltage power line to the PLC-IPI module through a power supply connection to the thermostat, wherein the low power supply line carries control instructional data to the thermostat and measures status response data from the thermostat via a data link of the PLC-IPI module to the MST and wherein the data link of the PLC-IPI module to the MST allows remote access, monitoring, and control of the thermostat from within and outside the PLC based LAN and wherein the PLC-IPI module comprises a coupler filter, the coupler filter being connected to the low voltage power supply line, the coupler filter allowing only modulated data, either broad band or narrow band, to come over the power line and pass through to a communication module, thereby isolating the communication module from the power supply;

a furnace/AC control link configured to connect the thermostat to the furnace/AC unit; and wherein the USNAP interface between the thermostat and the PLC-IPI module is standardized and allows commercially available thermostats to be used with the PLC-IPI module without major changes.

2. A method that enables a power line communication local area network (PLC LAN) having an internet gateway to be communicatively connected to a PLC based Universal Smart Network Access Port (USNAP) compliant thermostat PLC-interface plug-in (PLC-IPI) module for a thermostat for environment climate control, comprising:

providing a master unit (MST) configured to provide computing power and storage capability necessary to collect and compile power consumption information, wherein the MST is the internet gateway connecting to a broad band communication modem and enables a communication pathway to the internet;

providing a step-down transformer at a furnace/air conditioning (AC) unit configured to provide a low voltage power supply via a low voltage power line to the PLC-IPI module through a power supply connection to the thermostat, wherein the low power supply line carries control instructional data to the thermostat and measures status response data from the thermostat via a data link of the PLC-IPI module to the MST and wherein the data link of the PLC-IPI module to the MST allows remote access, monitoring, and control of the thermostat from within and outside the PLC based LAN and wherein the PLC-IPI module comprises a coupler filter, the coupler filter being connected to the low voltage power supply line, the coupler filter allowing only modulated data, either broad band or narrow band, to come over the power line and pass through to a communication module, thereby isolating the communication module from the power supply;

providing a furnace/air conditioning (AC) control link configured to connect the thermostat to the furnace/AC unit; and wherein the USNAP interface between the thermostat and the PLC-IPI module is standardized and allows commercially available thermostats to be used with the PLC-IPI module without major changes.

3. An apparatus for a power line communication (PLC) based Universal Smart Network Access Port (USNAP) compliant thermostat PLC-interface plug-in (PLC-IPI) to enable remote monitoring and controlling of climatic control of an environment, comprising:

a power connection and switch unit configured to receive low voltage power generated by a step-down transformer at a furnace/air conditioning (AC) location that is sent over a low voltage power line, wherein the power connection and switch unit supplies power to a thermostat;

a communication module;

a microprocessor unit (MCU); and a switch control connection from MCU to provide controlling and monitoring of power flow from the low voltage power supply line to the thermostat;

wherein the low voltage power line is part of a PLC local area network (LAN) and is connected to the communication module through a coupler filter, the coupler filter being connected to the low voltage power supply line, and wherein the coupler filter allows only modulated data, either broad band or narrow band, to come over the power line and pass through to the communication module, thereby isolating the communication module from the power supply;

wherein the communication module serves as a link between the MCU and the low voltage power supply line as part of the PLC LAN network by passing modulated information and monitored data provided by the MCU to the low voltage power line;

wherein the MCU is connected to the thermostat through a USNAP compliant interface port;

wherein thermostat sensors measure and collect data about a status of the climatic control of the environment and pass the data to the MCU, wherein the MCU compiles and processes the data, and then modulates the climatic control via the communication module; and wherein control instructions are sent remotely over the low voltage power line and are received and demodulated by the communication module and passed on to the MCU for remote control and programming via the USNAP interface of the thermostat.

4. A method for a power line communication (PLC) based Universal Smart Network Access Port (USNAP) compliant thermostat PLC-interface plug-in (PLC-IPI) to enable remote monitoring and controlling of climatic control of an environment, comprising:

providing a power connection and switch unit configured to receive low voltage power generated by a step-down transformer at a furnace/air conditioning (AC) location that is sent over a low voltage power line, wherein the power connection and switch unit supplies power to a thermostat;

providing a communication module;

providing a microprocessor unit (MCU); and providing a switch control connection from MCU to provide controlling and monitoring of power flow from the low voltage power supply line to the thermostat;

wherein the low voltage power line is part of a PLC local area network (LAN) and is connected to the communication module through a coupler filter, the coupler filter being connected to the low voltage power supply line, and wherein the coupler filter allows only modulated data, either broad band or narrow band, to come over the power line and pass through to the communication module, thereby isolating the communication module from the power supply;

wherein the communication module serves as a link between the MCU and the low voltage power supply line as part of the PLC LAN network by passing modulated information and monitored data provided by the MCU to the low voltage power line;

wherein the MCU is connected to the thermostat through a USNAP compliant interface port;

wherein thermostat sensors measure and collect data about a status of the climatic control of the environment and pass the data to the MCU, wherein the MCU compiles and processes the data, and then modulates the climatic control via the communication module; and wherein control instructions are sent remotely over the low voltage power line and are received and demodulated by the communication module and passed on to the MCU for remote control and programming via the USNAP interface of the thermostat.

\* \* \* \* \*